United States Patent [19]
Takasugi et al.

[11] Patent Number: 4,817,066
[45] Date of Patent: Mar. 28, 1989

[54] TRANSMITTER/RECEIVER FOR ULTRASONIC DIAGNOSTIC SYSTEM

[75] Inventors: Wasao Takasugi, Higashiyamato; Ryuichi Shinomura, Kodaira; Takeaki Okabe, Tokyo, all of Japan

[73] Assignees: Hitachi, Ltd; Hitachi Medical Corp., both of Tokyo, Japan

[21] Appl. No.: 900,990

[22] Filed: Aug. 27, 1986

[30] Foreign Application Priority Data

Oct. 9, 1985 [JP] Japan ............... 60-223609
Jul. 15, 1986 [JP] Japan ............... 61-164827

[51] Int. Cl.[4] ............................................. H04B 1/02
[52] U.S. Cl. ...................................... 367/137; 367/903; 367/105; 73/626; 128/660.01
[58] Field of Search .............. 367/87, 105, 137, 903; 310/317, 318; 73/609, 610, 612, 626; 128/660

[56] References Cited

U.S. PATENT DOCUMENTS

| | | |
|---|---|---|
| 2,475,609 | 7/1949 | Gauld .................................... 367/87 |
| 3,102,991 | 9/1963 | Jess ...................................... 367/105 |
| 3,119,999 | 1/1964 | Jaffe ..................................... 367/87 |
| 3,425,031 | 1/1969 | Klee ..................................... 367/87 |
| 4,001,763 | 1/1977 | Kits van Heyningen ......... 367/105 |
| 4,139,834 | 2/1979 | Matsui et al. ...................... 367/105 |
| 4,218,768 | 8/1980 | Hassler ............................... 367/105 |

*Primary Examiner*—Nelson Moskowitz
*Assistant Examiner*—Daniel T. Pihulic
*Attorney, Agent, or Firm*—Antonelli, Terry & Wands

[57] ABSTRACT

A transmitter/receiver for suppling a pulse power to a transducer and receiving a signal from the transducer comprises a parallel connection of a first circuit including a first switch element connected in series with a power supply having one terminal thereof connected to a common potential point, a second circuit including a second switch element connected in series with a receiver having one end thereof connected to the common potential point, and a third circuit including the transducer having one end thereof connected to the common potential point.

5 Claims, 10 Drawing Sheets

(A) SWITCH 203
(B) SWITCH 204
(C) LOAD TERMINAL VOLTAGE

TRANSMITTER/RECEIVER FOR ULTRASONIC DIAGNOSTIC SYSTEM

BACKGROUND OF THE INVENTION

The present invention relates to a transmitter/receiver used in an ultrasonic wave diagnostic system, and more particularly to a signal transmitter/receiver for driving a pulse of a transducer and receiving a signal from the transducer.

A transmitter/receiver used in prior art ultrasonic wave tomogram devices basically comprises an oscillator having a capacitor and a high speed switch. This circuit presents problems in constructing it into an integrated circuit. Namely, a capacitor and an inductor for forming a resonance circuit are necessary but it is difficult to form those elements in the IC. A transducer as well as a resistor and an inductor, through which a charge stored in the capacitor is discharged, and circuit components to protect the receiver circuit are parallelly connected to the high speed switch as loads. As a result, an output transistor of the high speed switch must be of large size, and a pre-driver for driving the output transistor must also be of large size. These are disadvantageous to the IC implementation.

SUMMARY OF THE INVENTION

It is an object of the present invention to provide a transmitter/receiver of an ultrasonic diagnostic system suitable for IC implementation.

It is another object of the present invention to provide a transmitter/receiver capable of imparting to an output element of a transmitter a function of an isolation element between the transmitter and the receiver.

It is still another object of the present invention to provide a transmitter/receiver in which an output element of a transmitter has a function of being a selection switch element for a low level signal and a receiver common to a plurality of transducer elements is provided so that the number of receivers smaller than the number of transducer elements.

In accordance with one aspect of the present invention, the transmitter/receiver is a parallel connection of a first circuit including a first switch element connected in series with a power supply having one terminal thereof connected to a common potential point, a second circuit including a second switch element connected in series with a receiver having one end thereof connected to the common potential point, and a third circuit including the transducer having one end thereof connected to the common potential point.

In another aspect of the present invention, a transmitter/receiver for supplying a pulse power to a number of transducer elements arranged in an array and receiving signals from the transducer elements is provided, wherein a transmitter including a driver for selectively driving a transducer element in accordance with a control signal is provided for each transducer element, and a receiver for selectively detecting the signals from the transducer elements in accordance with a control signal is provided. Output terminals of the drivers of the transmitter group comprising the plurality of transmitters are connected in common to the receiver.

DESCRIPTION OF THE PREFERRED EMBODIMENTS

Prior to the description of the embodiments of the present invention, a basic configuration of the circuit of the present invention is explained with reference to FIG. 1.

Figure 1:
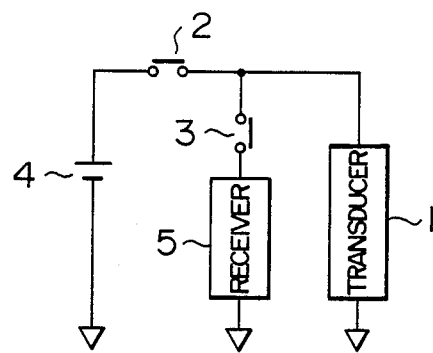
FIG. 1 shows a basic configuration of the present invention.

In FIG. 1, numeral 4 denotes a power supply, numerals 2 and 3 denotes driver elements, number 1 denote a transducer element and numeral 5 denotes a receiver for a signal from the transducer. A pulse voltage from the power supply 4 is applied to the transducer 1 by turning on the driver 2 for a predetermined time depending on a characteristic of the transducer. Then, the driver 2 is turned off and the driver 3 is turned on. The drive to the transducer 1 includes a sequence of operations by the drivers 2 and 3. When driven, an impedance of the signal receiver 5 to the drive signal is sufficiently low. The signal produced by the transducer 1 is received by the receiver 5. An input impedance of the receiver 5 in its receive mode is sufficiently low and a signal current flowing therethrough is detected (current detection system), or the input impedance in the receive mode is high and a signal voltage from the transducer 1 is detected by a circuit including an on-resistance of the driver 3 (voltage detection system). In any detection system, the common terminal to the transducer 1, power supply 4 and receiver 5 may be a ground terminal. No voltage of the power supply 4 is applied across the terminals (signal receiving terminals) of the receiver 5. Accordingly, a high voltage protection circuit is not required at the input of the receiver as opposed to the prior art system.

Figure 2:
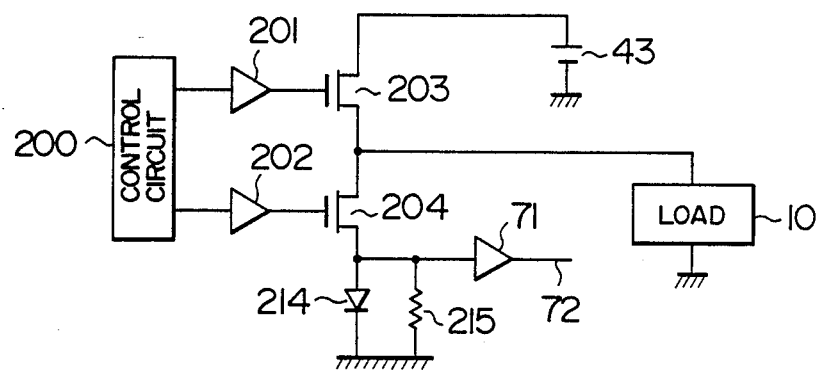
FIG. 2 shows one embodiment of the present invention.
Figure 3:
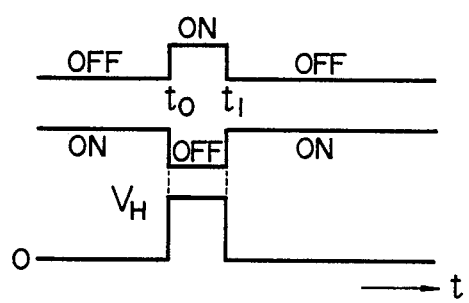
FIG. 3 illustrates an operation thereof.

Referring to FIG. 2, one embodiment of the present invention is explained. Driver (switching) elements comprise two elements 203 and 204 which are MOS transistors. Control voltages are applied to the drivers 203 and 204 by predrivers 201 and 202 so that the drivers 203 and 204 switch. The control signals are generated by a control circuit 200. A load 10 is connected between a junction of the drivers 203 and 204 and ground. A high voltage supply 43 is connected between the driver 203 and the ground. A parallel circuit of a diode 214 and a resistor 215 is connected between the driver 204 and the ground, and an amplifier 71 is connected to amplify a signal voltage developed across the resistor 215. The operation of FIG. 2 is explained below. FIG. 3 at A and B illustrates the operation of the switches 203 and 204. The switches 203 and 204 turn on and off in a reverse relationship. The switch 203 turns on for a period $t_0-t_1$ and turns off for other period. The switch 204 turns off for the period $t_0-t_1$ and turns on for other period. As a result, the voltage $V_H$ of the power supply 43 is applied to the load element only for the period $t_0-t_1$ as shown at C in FIG. 3. A static capacitance of the load 10 is charged for the period $t_0-t_1$ by the voltage $V_H$ of the power supply 43 through the switch 203, and discharged through the switch 204 when $t > t_1$. Current capacities of the switches 203 and 204 are determined by energy supply to a resistive component of the load 10 and a reactive current. The resistor 215 serves as a load resistance in the receive mode, and the diode 214 serves as a current path. The operation of FIG. 2 in the drive mode has been described above. Thus, the pulse shown at C in FIG. 3 is applied to the load (piezoelectric element) and the circuit functions as the driver as it does in FIG. 1. The diode 214 flows therethrough the discharge current from the load 10 during the on-period of the switch 204. When an ultrasonic wave is emitted by the piezoelectric element, an echo signal is received. This will be explained below. In the receive mode, the switch 203 is off and the switch 204 is on. Since the amplitude of the received signal is usually sufficiently lower than a forward voltage of the diode 214 and no forward current is flowing through the diode, the diode 214 is turned off to the received signal. Accordingly, for the echo signal, the load resistance 215 is connected through the on-resistance of the switch 204. Thus, transmission/reception function is attained by supplying the voltage across the resistor 215 to the amplifier 71. A feature of FIG. 2 resides in that the high voltage of the power supply 43 is not applied to the input of the amplifier 71. While the high voltage is applied to the load, the switch 204 is turned off and the input to the amplifier 71 is zero. On the other hand, while the switch 204 is on, the power supply 43 is isolated by the switch 203 and the discharge current of the load flows through the diode 214 and the input is clamped to the forward voltage. A damping resistor is not necessary because an inductor is not used in the drive mode. Accordingly, the load resistance 215 may be determined independently from a drive condition.

Figure 4:
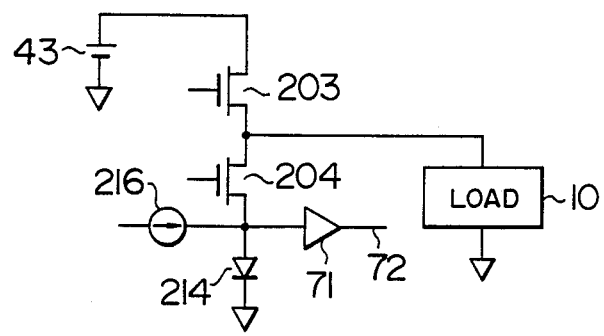
FIGS. 4, 5, 6 and 8 show other embodiments of the present invention.

FIG. 4 shows a second embodiment of the present invention. In FIG. 4, a bias current source 216 to the diode 214 is additionally provided to the arrangement of FIG. 2. The operation of FIG. 4 in the drive mode is same as that of FIG. 2 but it is different in the receive mode. In FIG. 2, the diode 214 is off (sufficiently high impedance) for the received signal, but in FIG. 4, it is on by the bias current, and a signal current flowing through the on-diode is detected. Thus, the diode 214 and the amplifier 71 form a current detection circuit.

Figure 5:
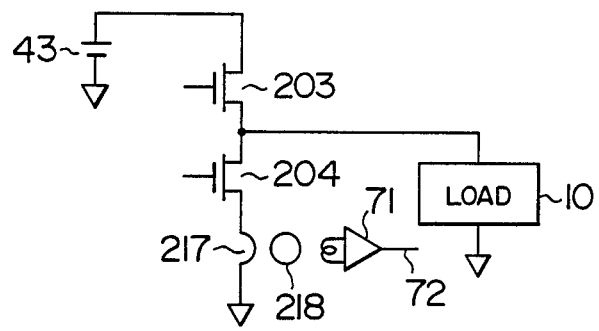

FIG. 5 shows a third embodiment of the present invention. In FIG. 5, a signal current flowing through the switch 204 is detected as is done in FIG. 4. In FIG. 5, a current detection transformer 218 is used. A primary winding 217 of the current detection transformer exhibits a sufficiently low impedance to the drive signal and the received signal. In the current detection systems shown in FIGS. 4 and 5, the load resistor 215 shown in FIG. 2 is not used.

Figure 6:
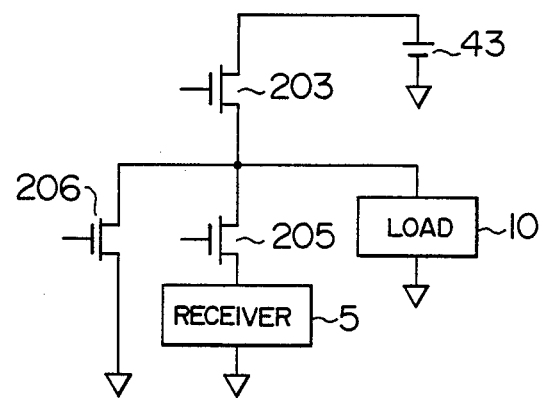
Figure 7:
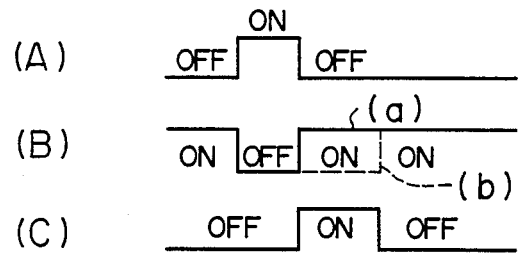
FIG. 7 illustrates an operation of FIG. 6.
Figure 8:
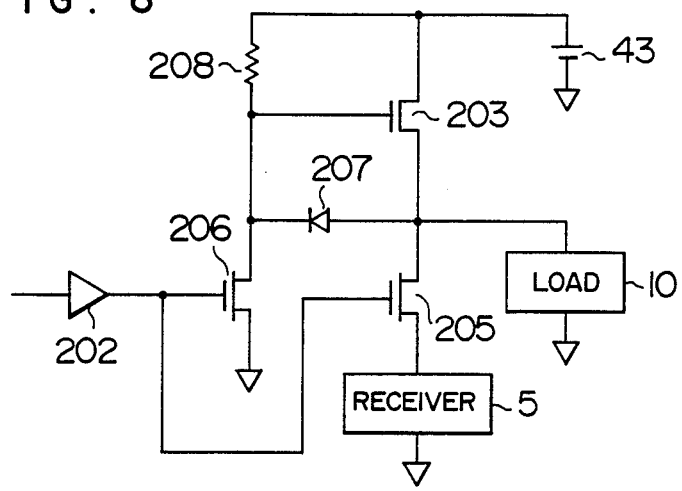

FIG. 6 shows a fourth embodiment of the present invention. In the present embodiment, the switch 204 in the embodiments of FIGS. 2, 4 and 5 is replaced by two parallel switches 205 and 206 and the receiver 5 is connected to the switch 205. The switches 205 and 206 are designed such that a current flowing through the switch 206 is sufficiently larger than that of the switch 205. When MOS transistors are used, the device area of the switch 206 is larger than that of the switch 205. In the present embodiment, the drive operation is carried out at the same timing as the switch 204 of the previous embodiment to control the two parallel switches 205 and 206. In the receive mode, the switch 206 to which the receiver is not connected is turned off. FIG. 7 illustrates the operation. FIG. 7 at A illustrates the operation of the switch 203, FIG. 7 at B illustrates the operation of the switch 205 and FIG. 7 at C illustrates the operation of the switch 206. The switch 205 may be controlled to operate as shown either FIG. 7 at A or B. In the present embodiment, a large current (discharge current) in the drive mode is prevented from flowing into the receiver 5 by the current limit function of the element 205. The receiver 5 may be one used in any of the previous embodiments. FIG. 8 shows a method for simplifying the control to the parallel elements in the embodiment of FIG. 6. A diode 207 is connected to the element 206. Like the diode 214 shown in FIG. 2, the diode 207 exhibits a high impedance in the receive mode and the element 206 is connected in parallel to the element 205 only in the drive mode and equivalently turned off in the receive mode. Thus, the elements 205 and 206 may be operated by the same control signal. The diode 207 in the embodiment of FIG. 8 also functions as a driver to the switch element 203 together with the resistor 208.

In the above embodiments, the MOS transistors are used as the switch elements, although bipolar transistors, SCR's or other switch elements may be used. The control signal circuit may change depending on the type of the switch elements but there will be no difficulty in implementation.

Figure 9A:
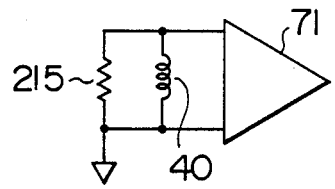
FIGS. 9A and 9B show an embodiment of a receiver.
Figure 9B:
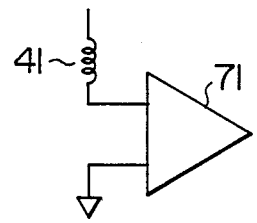

In the present invention, the receiver may include an inductor as a signal compensation element in the receive mode as is done in the prior art circuit. In FIG. 9A, a parallel inductor is used, and in FIG. 9B, a series inductor is used.

In accordance with the above embodiments, the transducer is permitted an ideal power supply drive, the receiver is prevented from being influenced by the drive voltage and current during the reception of the signal from one transducer, either the voltage signal or the current signal may be detected, and the use of L, C, R elements, which have been used in the prior art circuit, is minimized. Those features are effective when a number of circuits are integrated. The drivers, pre-drivers and receivers can be readily integrated.

In accordance with the configurations of the present invention described above, by connecting the output terminals of the drivers of the transmitters in common to one receiver, the signal on the receiver channel having the on-switch element connected to the receiver amplifier can be selectively detected. Thus, the switch elements of the transmitters may have a function of selection element to a low level signal (received signal). If a plurality of switch elements of the transmitters are simultaneously on, the receiver amplifier detects a sum of the signals of the plurality of transmitters.

Figure 10:
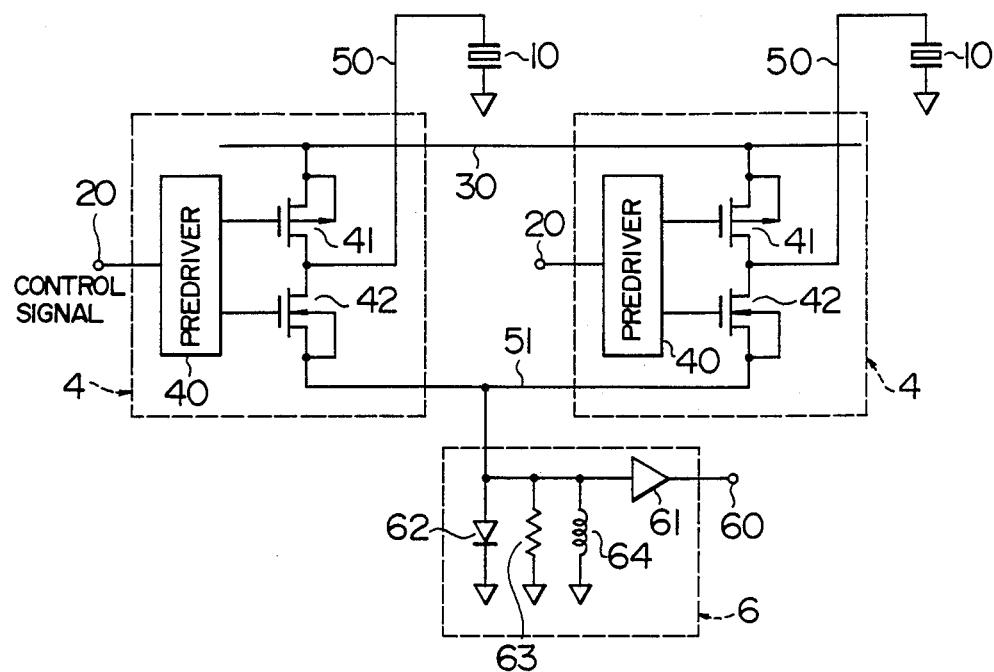
FIG. 10 shows a circuit configuration of another embodiment of the present invention.

FIG. 10 shows a configuration of an embodiment in which a receiver is common to a plurality of transmitters. In FIG. 10, numeral 10 denotes a transducer, numeral 20 denotes a control signal, numeral 30 denotes a D.C. power supply, numeral 40 denotes a pre-driver, numerals 41 and 42 denote driver elements, numeral 50 denotes a cable or wiring, numeral 61 denotes a receiver amplifier, numeral 62 denotes a diode, numeral 63 denotes a load resistor and numeral 64 denotes an inductor. The pre-driver 40 and driver elements 41 and 42 form a transmitter 4. In the present embodiment, the driver element 41 is a D-channel MOS FET and the driver element 42 is an N-channel MOS FET. The receiver amplifier 61, diode 62, and load resistor 63 and inductor 64 form a receiver 6. The inductor 64 is inserted in parallel to parasitic static capacitances of the cable 50 and transducer 10 to compensate for the static capacitances by a resonance characteristic. It may be inserted as required, or may not be inserted. The transmitter 4 is connected to the associated transducer 10 through the cable 50, and one end of the driver element 42 in the transmitter is connected to the common line 51, then to the common receiver 6.

When the driver element 41 is off and the driver element 42 is on (hereinafter called a state "0"), no voltage is applied to the transducer 10. When the driver element 41 is on and the driver element 42 is off (hereinafter called a state "1"), a voltage is applied to the transducer 10 from the power supply 30 through the driver element 41 and the cable 50. As the states of the driver elements 41 and 42 change "0"→"1"→"0" by the control signal 20, the transducer 10 is charged from the power supply 30 through the driver element 41 and the cable 50 during the period of the state "1", and the charge is discharged through the cable 50, driver element 42, common line 51 and diode 62 during the period of the state "0". It is also discharged through the load resistor 63 and inductor 64.

As a result, a pulse voltage is applied to the transducer 10 only for the period of the state "1". This period is determined in accordance with the characteristic of the transducer 10. By repeating the above operation, the corresponding pulse voltages are applied. Since the transmitters 4 each including the drivers 41 and 42 are concented one to each of the transducers 10, the respective transducers are charged through the respective cables and the charges are discharged through the common line 51 and the diode 62. Accordingly, the transmission to each of the transducers can be controlled by the control signal 20 applied to the associated driver elements 41 and 42. The received signal (echo signal in the diagnostic system) in the transducer 10 is supplied to the receiver amplifier 61 through the cable 50, driver element 42, common line 51 and load resistor 63. Accordingly, the received signal is supplied to the receiver amplifier 61 only when the driver element 42 is on. Thus, the driver element 42 functions as a switch to a low level analog received signal. Accordingly, by selectively controlling the switch function for the plurality of transducers, the received signal of only the selected transducer can be supplied to the receiver amplifier. The driver element 42 functions as a multiplexor to the received analog signals. The amplitude of the received signal is usually smaller than the forward voltage of the diode 62, and only the resistor 63 is a load to the received signal. Since the discharge current in the transmit mode flows mainly through the diode 62, a current flowing through the inductor 64 is small.

Figure 11:
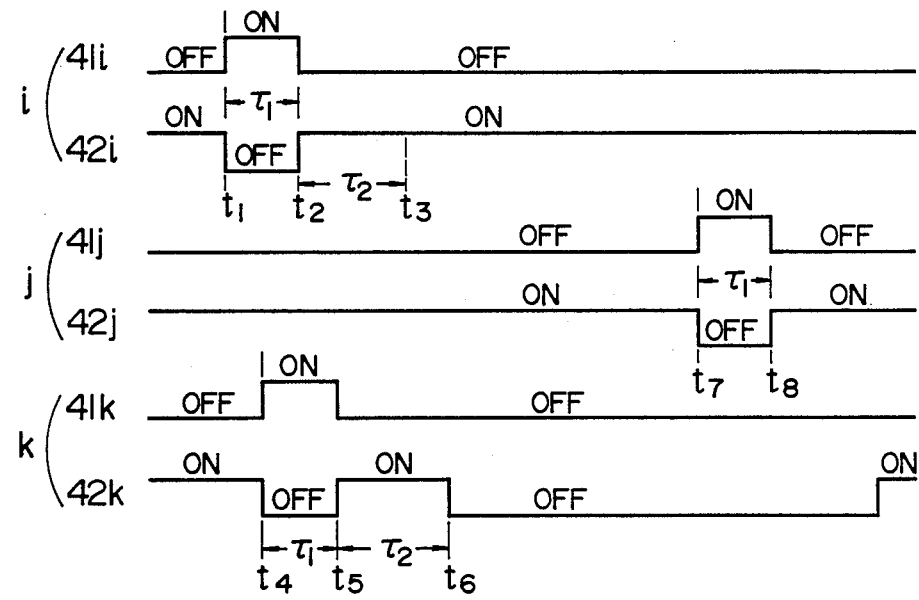
FIG. 11 illustrates control and operation of FIG. 10, FIGS. 12, 13 and 14 show other embodiments.

FIG. 11 illustrates control and operation in the embodiment of FIG. 10. In FIG. 11, i, j and k denote transmitter/receivers in channels i, j and k, respectively, and numerals 41$i$, 42$i$, . . . denote driver elements in the channel i. For the channel i, a pulse having a width $\tau_1$ is transmitted at time $t_1$. In a period $\tau_2$ from time $t_2$, the discharge of the transducer is completed. Thus, the period $t_1$-$t_3$ is for transmit mode, and the period after time $t_3$ is for receive mode. For the channel j, the state "0" is maintained during the period $t_1$-$t_3$ and until time $t_7$, and no transmission is carried out. However, the receiver is in the receive mode and any signal from the transducer in the channel j is supplied to the receiver. For the channel k, the transmit mode starts from time $t_4$. When the discharge of the transducer k is completed in the period $t_5$-$t_6$, the driver elements 41$k$ and 42$k$ are turned off and the transducer k is disconnected from the receiver amplifier. Thus, the channel k can transmit but cannot receive the signal. Between time $t_3$ and time $t_7$, the channels i and j are in the receive mode and the received signals from the transducers i and j are supplied to the receive amplifier. A sum of those signals may be detected if the receiver amplifier has an adder circuit.

As described above, in the channels i, j and k, the transmission can be carried out by all of the channels i, j and k, any two of the three channels, any one of the three channels or no channel. In a particular channel, both transmission and reception are carried out, transmission is carried out but reception is not, transmission is not carried out but reception is, or neither transmission nor reception is carried out. In an overall system, the above modes are combined to attain a desired function. The control is attained by turning on and off the driver elements 41 and 42 of the respective channels by the control signals 20 for the respective channels.

Figure 12:
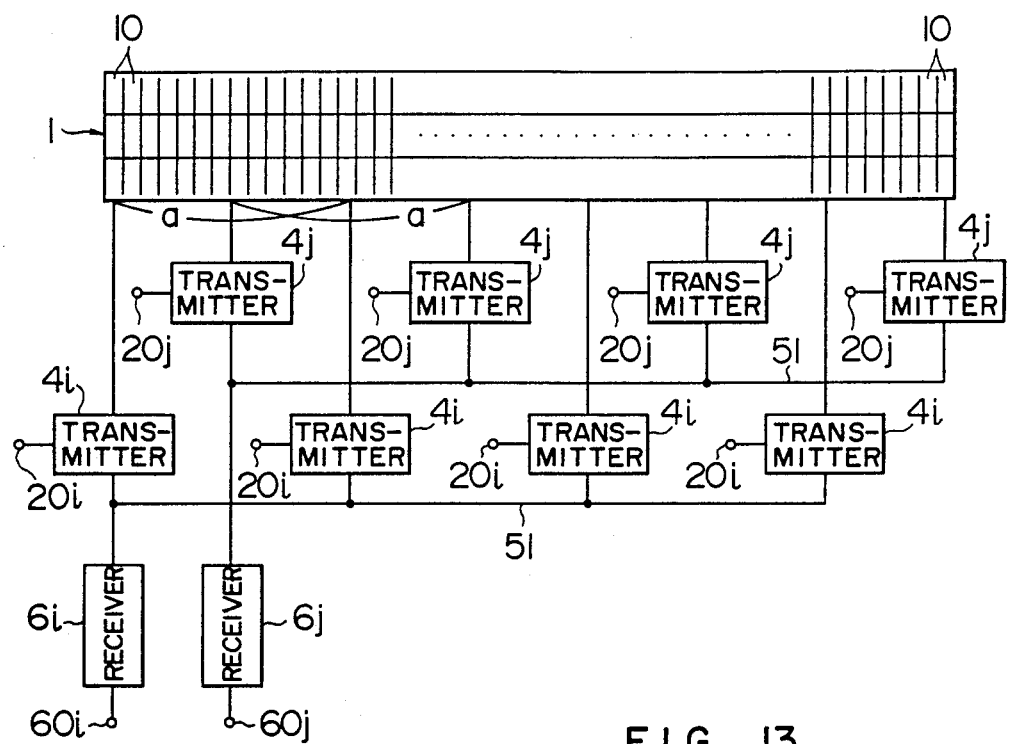

FIG. 12 shows another embodiment of the present invention, applied to a transmitter/receiver for a plurality of array transducers. A transducer array 1 comprises a plurality of transducers 10 of the same rectangular shape arranged in array. Transmitters 4 are provided one for each of the transducers 10 in the transducer array 1, and receivers 6 are provided one for each of combinations of transducers 10 arranged in specific coordinates. Namely, one common receiver is provided to the transducers 10 in one combination. In FIG. 12, i and j indicate groups of combination. The present embodiment is effectively applied to a linear electron scan ultrasonic diagnostic system. A pitch of the transducers a in each group is selected to be equal to a maximum aperture of an ultrasonic wave beam of the diagnostic system. Thus, more than one transmitter/receivers connected to each group do not operate simultaneously and the configuration of the system can be simplified. When the circuits are integrated for each group, it can be operated with a small power because each channel does not operate simultaneously with other channel.

Figure 13:
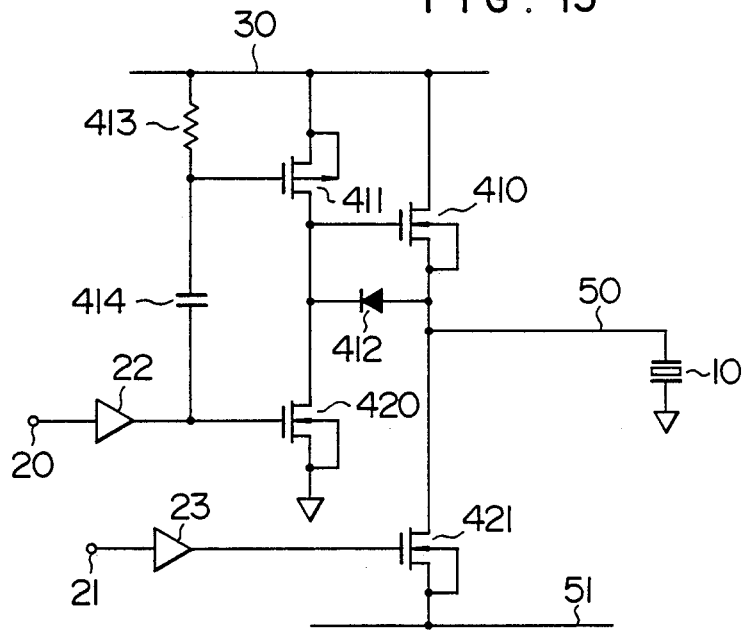

FIG. 13 shows another embodiment of the present invention. In the present embodiment, driver elements are transistors 410 and 420, and diode 412, resistor 413 and capacitor 414 form a pre-driver and a biasing circuit therefor. The transistor 421 may function as the driver element or only as a receiver switch. In order to separately control the transmission and reception functions, a transmission control signal channel 20, 22 and a reception control signal channel are separately provided. When the circuit of FIG. 13 is used as the transmitter 4 of the embodiment shown in FIG. 10 or FIG. 12, the.

same function and advantage as those in the previous embodiments are attained.

Figure 14:
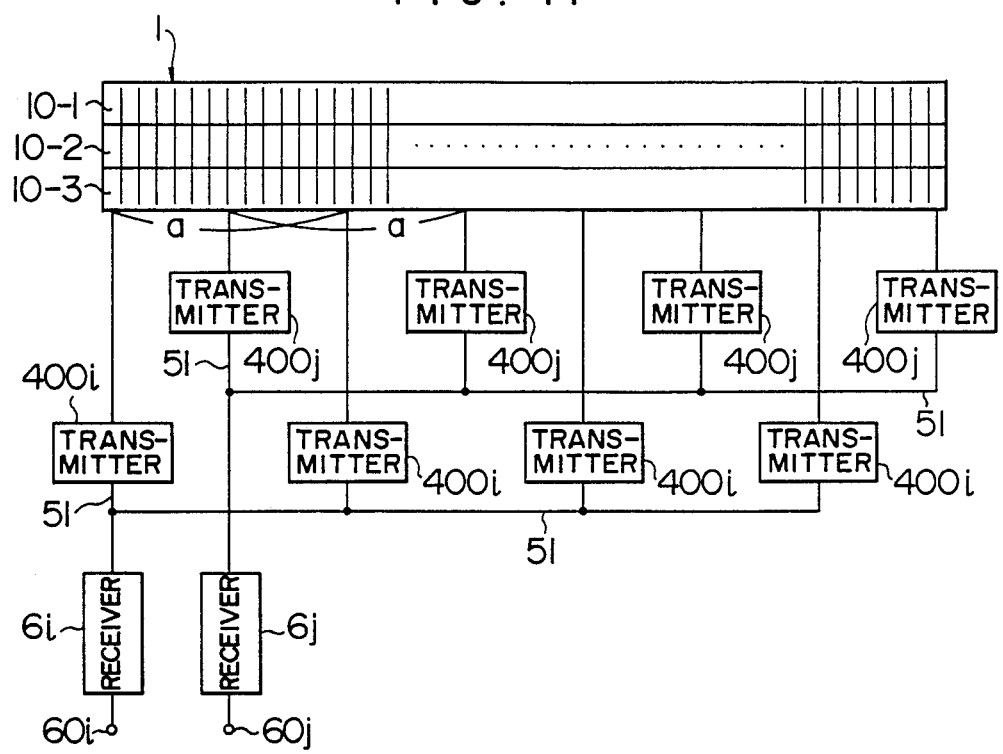
Figure 15:
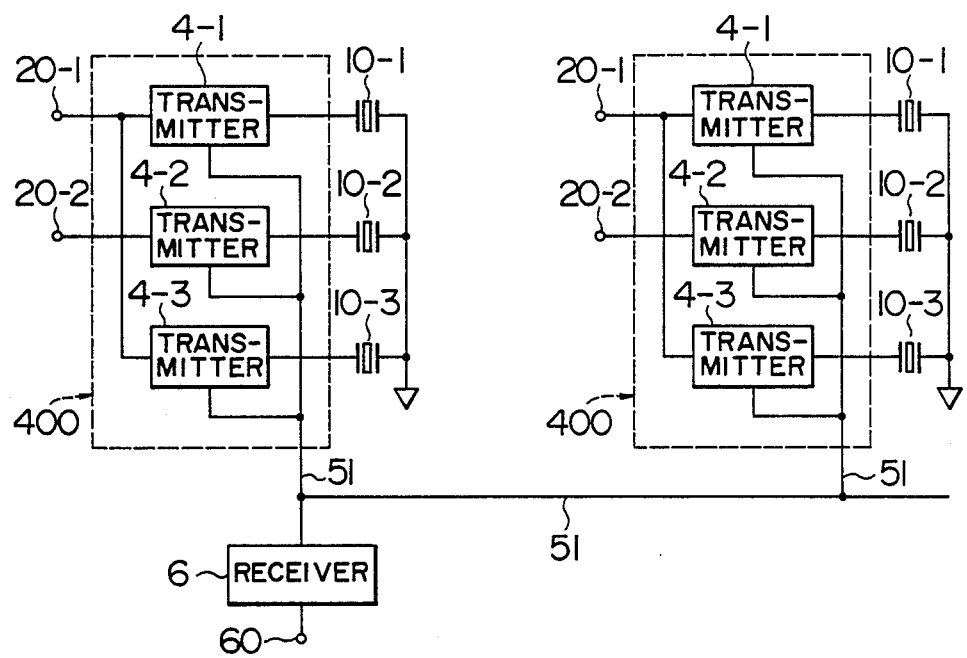
FIG. 15 shows a detail of a portion of FIG. 14.

FIG. 14 shows another embodiment of the present invention in which transducers are arranged two-dimensionally rather than one-dimensionally as shown in FIG. 12. Specifically, the transducer array is divided into three sections 10-1, 10-2 and 10-3. Transmitters 400 corresponding to the transmitters 4 shown in FIG. 12 are coupled one to each of the three sections. In FIG. 14, i and j represent the same as in FIG. 12. In the transmitter 400, transmitters 4-1, 4-2 and 4-3 are coupled to the transducers 10-1, 10-2 and 10-3, respectively, as shown in FIG. 15. Those transmitters may be ones shown in FIG. 10 or 13. The common line 51 of the transmitters 4-1, 4-2 and 4-3 is connected with the common lines 51 of other similar circuits, then to the receiver 6. In the present embodiment, one or more of the three transducer sections 10-1, 10-2 and 10-3 are controlled to simultaneously transmit or receive signals, and the sum signal flows into the common line 51. In the transducer arrays i and j, only one of them operates at a time as is done in FIG. 12. Thus, the linear scan is permitted and the transmission/reception control in the direction transverse to the scan direction, that is, the width direction of the two-dimension transducer array 1 is permitted so that the quality of the transmitted/received ultrasonic wave beam is significantly improved. When the number of divisions in the width direction is increased, the same method may be employed.

Figure 16:
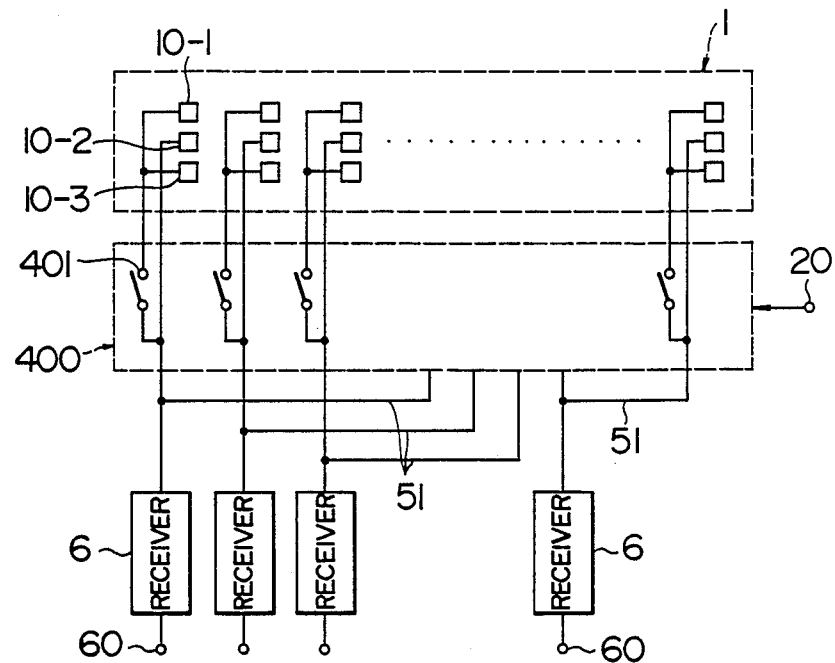
FIG. 16 shows a circuit configuration for illustrating control in the embodiment of FIG. 14.

FIG. 16 shows a control method. The switch 401 in FIG. 16 represents the transmission/reception function of the driver element in FIG. 13. The three transducer sections 10-1, 10-2 and 10-3 are grouped into the center section 10-2 and the side sections 10-1 and 10-3, and the center section 10-2 is controlled in the same manner as that in the embodiment of FIG. 12 and the side sections 10-1 and 10-3 are controlled so that they are simultaneously disconnected or connected. In this manner, the width of the transducer array can be changed instead of connection/disconnection control of the side transducer sections to the center transducer section, each section may be controlled for transmission/reception at a predetermined timing so that the control of collection of the ultrasonic wave and the control of deflection can be made in the longitudinal direction as well as the width direction.

In the embodiments shown in FIGS. 10 to 16, the driver elements of the transmitter are used as control switches for the received signals, or the switch elements for controlling the received signals are coupled to the transmitters. Accordingly, the configuration of the pre-driver and the control method, and the configuration of the receiver and the signal detection method (for example, voltage detection system or current detection system) are not limited to those shown in the embodiments. When the receiver of the current detection system is used, the current addition function of the received signals can be readily attained.

Figure 17:
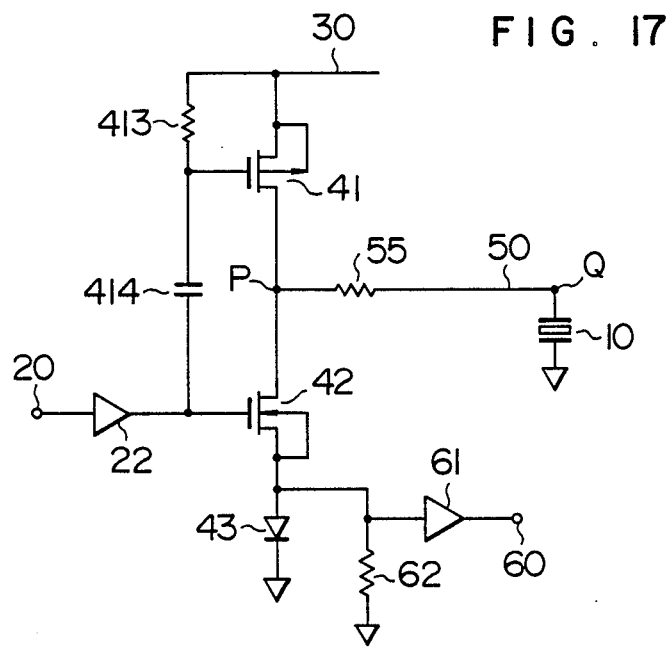
FIG. 17 shows a circuit configuration of another embodiment of the present invention.
Figure 18:
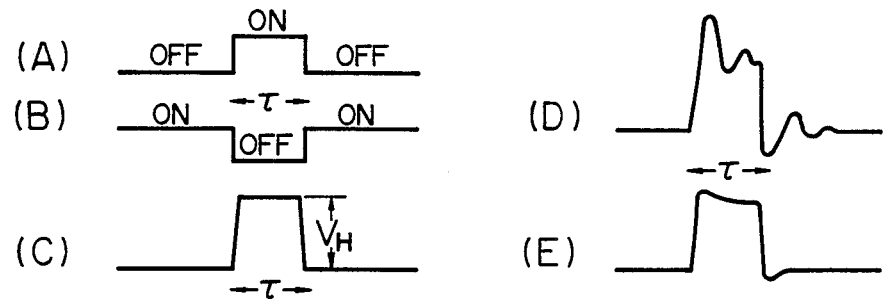
FIGS. 18A-18E illustrate operation and pulse waveforms in FIG. 17, FIGS. 19A and 19B show ultrasonic wave pulse waveforms transmitted from a transducer.
Figure 19A:
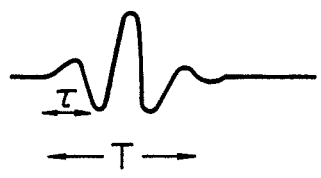
Figure 19B:
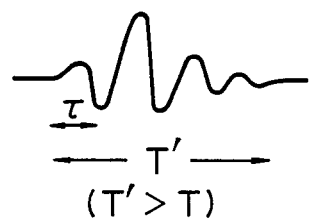
Figure 20:
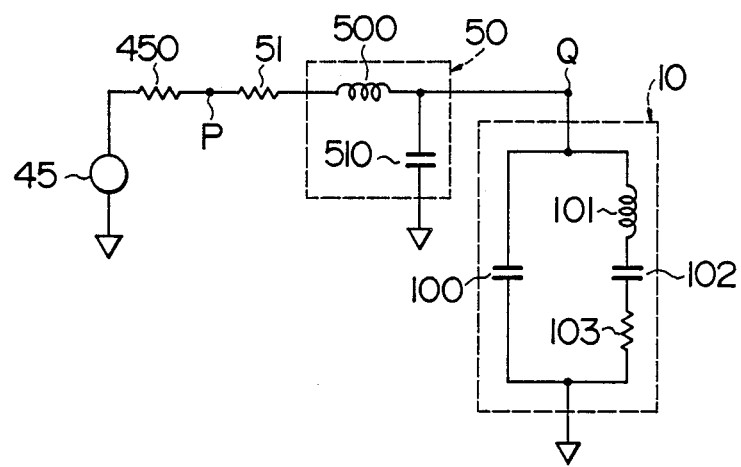
FIG. 20 shows an equivalent circuit of the embodiment of FIG. 17 to explain a principle of operation thereof.

FIG. 17 shows another embodiment of the present invention. In the present embodiment, a damping resistor 55 is inserted in the cable 50 at a point close to a junction P of the driver elements 41 and 42 and the cable 50, and the resistance of the resistor 55 is properly selected to suppress a sprious oscillation due to an impedance of the cable and the transmitter/receiver and improve a transmission/reception characteristic of a pulse signal. In a power supply drive system in which a pulse is transmitted to a piezoelectric transducer from a low impedance power supply, if the driver elements are coupled to the transducers by the cables, sprious oscillations are generated due to the impedance elements associated therewith and a characteristic of detection information in the ultrasonic wave device is deteriorated. The embodiment of FIG. 17 provides an approach to resolve the above problem. The sprious oscillation which causes the deterioration of the characteristic of the transmission/received pulse signal is mainly due to a parasitic static capacitance of the transducer and cable and a parasitic inductance of the cable. Thus, the damping resistor having the resistance which reduces Q of the resonance circuit to provide an optimum damping condition is inserted. In FIG. 17, numeral 10 denotes the transducer, numeral 20 denotes the transmission pulse signal, numeral 30 denotes the D.C. power supply of a voltage $D_H$, numerals 41 and 42 denote the driver elements, numeral 50 denotes the cable, numeral 55 denotes the damping resistor and numeral 61 denote the receiver amplifier. The transmission pulse voltage having the amplitude $V_H$, which is controlled by the transmission pulse signal 20 is applied to the transducer 10. Thus, the driver elements 41 and 42 are controlled to be turned on and off at timings shown in FIGS. 18A and 18B. The driver elements 41 and 42 in the embodiment of FIG. 17 may be P-channel and N-channel MOS FET's, respectively, as they are in the embodiment of FIG. 10. Pre-driver 22, resistor 413 and capacitor 414 form a circuit to control the driver elements 41 and 42 at the timing described above. A pulse voltage having a pulse width $\tau$ and an amplitude $V_H$ shown in FIG. 18C is applied to the transducer 10, where $\tau$ is selected to be equal to one half of a resonance period of the transducer. In FIG. 17, if the damping resistor 55 were not inserted, a waveform at the junction P of the driver elements 41 and 42 and the cable 50 is that shown in FIG. 8C but a waveform at a point Q close to the transducer would include a sprious oscillation as shown in FIG. 18D. The ultrasonic waveform transmitted from the transducer is preferably a pulse waveform shown in FIG. 19A. The pulse length T relates to a time resolution of an object to be measured by the ultrasonic wave device. The pulse length T is preferably short in order to improve the resolution. It relates to both the characteristic of the transducer (Q of mechanical resonance circuit) and the characteristic of the transmission pulse. If it is driven by the waveform which includes the sprious oscillation as shown in FIG. 18D, the waveform of the transmitted ultrasonic wave is disturbed as shown in FIG. 19B or the time T' is expanded and the characteristic of the detected information is deteriorated. A cause for the sprious oscillation shown in FIG. 18D is explained with reference to an equivalent circuit shown in FIG. 20. The driver is approximated by a pulse voltage source 45 and a signal source resistor 450, and the transducer 10 is approximated by an inductor 101, a capacitor 102, a resistor 103 and an interelectrode capacitor 100. The cable 50 is approximated by a series inductor 500 and a parallel capacitor 510. The resistor 450 has a resistance Rs, the inductor 500 has an inductance L and the capacitors 510 and 100 have a resultant capacitance C. A series resonance circuit having a resonance angular frequency $\omega_r = 1/\sqrt{LC}$ and $Q = \omega_R L/Rs$ is formed by the signal source and Rs, L and C. In the voltage drive having low Rs, a sprious oscillation is generated by the series resonance characteristic as shown in FIG. 18D and the voltage waveform at the point Q close to the transducer includes the sprious oscillation, unlike the waveform at the point P. In order to suppress the sprious oscillation by the series resonance circuit, the Q damping by the series resistance by increasing Rs to reduce Q is effective. The resistance 55 in FIG. 17 is inserted in series with the resistor 450 in the equivalent circuit of FIG. 20 to increase Rs. The resistance of the resistor 51 may be ten and several ohms to several tens ohms although it may vary depending on the resistances of the driver, cable and transducer. When the resistance of the resistor 51 is r, the resistance r* which results in Q=1 is given by $r^* = \sqrt{L/C} - Rs$. By selecting the resistor 51 to be equal to or close to r*, the waveform at the point Q close the transducer is good one as shown in FIG. 18E.

Figure 21:
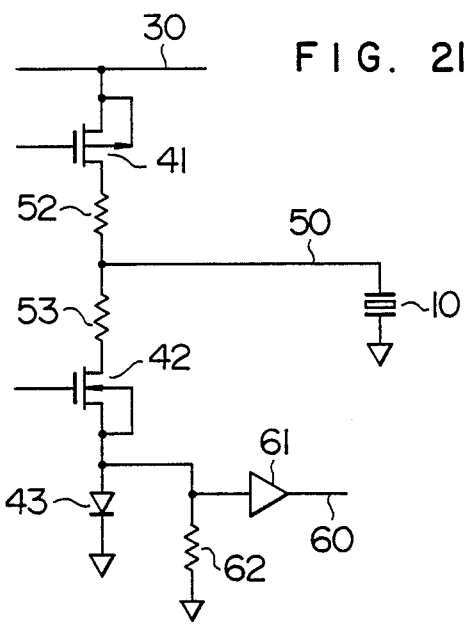
FIGS. 21, 22 and 23 show other embodiments of the present invention.

FIG. 21 shows another embodiment. In the present embodiment, the damping resistor 55 in FIG. 17 is divided into two resistors 52 and 53. The resistors 52 and 53 function as damping resistors during the on-periods of the transistors 41 and 42, respectively. Accordingly, they are selected to provide optimum conditions depending on the on-resistances of the transistors 41 and 42, respectively (corresponding to the resistor 450 or Rs in the equivalent circuit of FIG. 20). Since the resistors 52 and 53 are series with the on-resistances of the transistors 41 and 42 as seen from FIG. 21, those on-resistances may be used as the damping resistors. The device areas of the transistors 41 and 42 are determined by breakdown voltages, current values and on-resistances. The requirement to the on-resistance is one which is advantageous in implementing the driver by an integrated circuit as compared to a requirement in a conventional switch element in which the on-resistance should be as small as possible.

Figure 22:
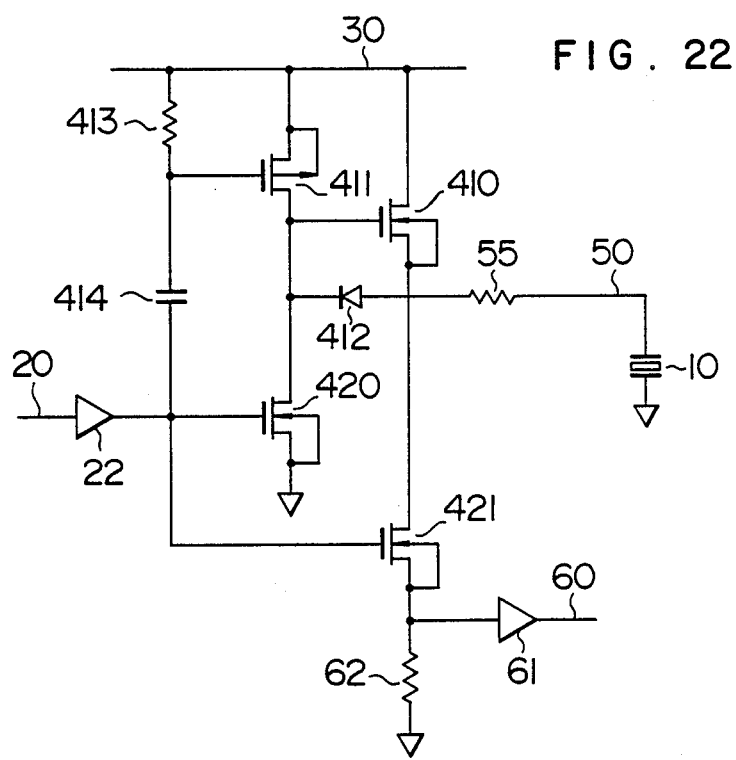

FIG. 22 shows another embodiment. In the present embodiment, a function equivalent to that of the P-channel driver element 41 of FIG. 17 is attained by P-channel transistor 411, N-channel transistor 410 and diode 412. N-channel transistors 420 and 421 may function equivalently to the N-channel transistor 42 of FIG. 8, or the transistor 421 may function as a switch to isolate a receiver circuit 61, 62, 60 from a transmitter. In the present embodiment, an optimum damping condition is attained by the resistor 55.

Figure 23:
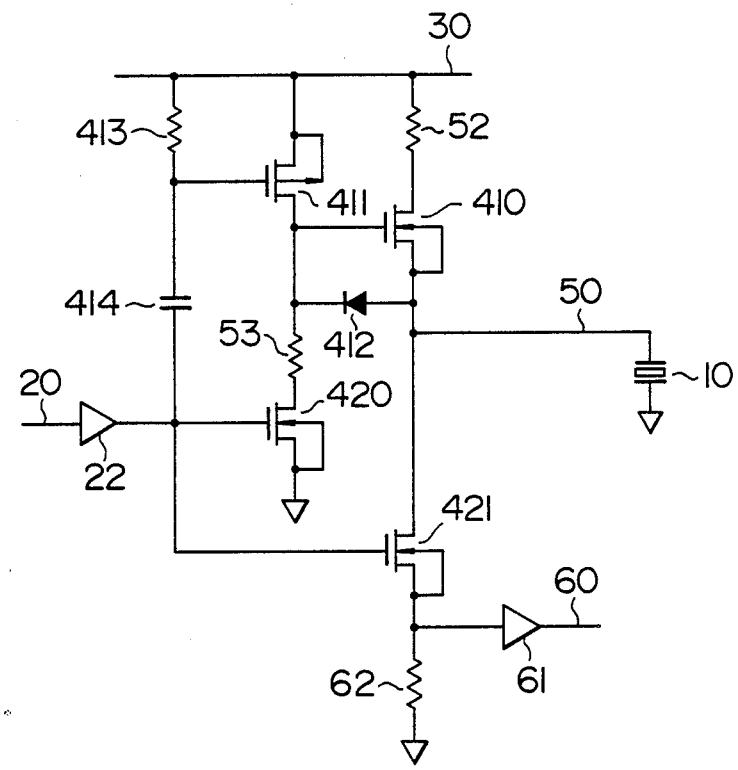

FIG. 23 shows another embodiment. In the present embodiment, separate damping resistors 52 and 53 are inserted into the driver shown in FIG. 22. The resistors 52 and 53 are connected to drains of the transistors 410 and 420 so that damping is attained without affecting to the switching characteristic of the transistors. In the present embodiment, the damping function may be attained by the on-resistances of the transistors 410 and 420.

In the above embodiments, the configurations of the on/off control circuits such as drivers 41, 42, 411, 410, 420 and 421 and the control timing thereto are not limited to those illustrated, and the polarities of the transistors (P-channel and N-channel) and the D.C. power supply 30 may be reversed.

When the damping resistance is optimized in accordance with the embodiments shown in FIGS. 17 to 23, the sprious oscillation developed in the pulse voltage applied to the transducer due to the parasitic impedance of the driver, transducer and cable or wiring therebetween can be suppressed, and the degradation of the characteristic of the detected information in the ultrasonic wave device can be prevented by very simple means. Such means may utilize the on-resistance of the transistor element of the driver so that the design of the element is facilitated. This is particularly effective from the standpoint of freedom of design of the element and the occupied area of the element, when the driver is implemented by the integrated circuit.

We claim:

1. A transmitter/receiver of an ultrasonic device for supplying a pulse power to a transducer and receiving a signal from the transducer, comprising
   (a) a driver circuit including first and second switch elements which are serially connected with one another, one end of said first switch element being connected to a DC power supply, one end of said second switch element being connected to a common potential point through a forward directional diode, and a junction of said first and second switch elements being connected to said transducer;
   (b) a receiving circuit connected to the connecting point of said second switch element and said diode; and
   (c) a control circuit for controlling an on and off operation of said first and second switch elements selectively in first and second operational modes, said first and second switch elements being alternately turned on in said first operational mode to intermittently connect said transducer to said DC power supply so that an intermittent driving signal is applied to said transducer with a period of said intermittent driving signal being determined by said alternating operation of said first and second switch elements, said first switch element being kept off and said second switch element being kept on in said second operational mode so that the output signal from said transducer is supplied to said receiving circuit.

2. A transmitter/receiver of an ultrasonic wave device for supplying a pulse power to a transducer and receiving a signal from the transducer, comprising
   (a) a driver circuit including first and second switch elements which are serially connected with one another, one end of said first switch element being connected to a DC power supply, one end of said second switch element being connected to a common potential point through a first coil of a transformer, and the connecting point of said first and second switch elements being connected to said transducer;
   (b) a receiving circuit connected to a second coil of said transformer; and
   (c) a control circuit for controlling an on and off operation of said first and second switch elements selectively in first and second operational modes, said first and second switch elements being alternately turned on in said first operational mode to intermittently connect said transducer to said DC power supply so that an intermittent driving signal is applied to said transducer with a period of said intermittent driving signal being determined by said alternating operation of said first and second switch elements, said first switch element being kept off and said second driving element being kept on in said second operational mode so that the output signal from said transducer is supplied to said receiving circuit.

3. A transmitter/receiver of an ultrasonic device for supplying a pulse power to a plurality of transducer elements arranged in array and receiving signals from the transducer elements, comprising (a) a plurality of driver circuits which are divided into several groups, each of said driver circuits including a first and second switch element which are serially connected with one another, one end of said first switch element being connected to a DC power supply, a junction of said first and said second switch elements being connected to a corresponding transducer element, and wherein the driver circuits in each group are commonly connected by a connecting line at one end of said second switch element;

(b) a plurality of diodes, each provided for each group of said driving circuits and connected between said connecting line and a common potential point; and (c) a plurality of receiving circuits, each provided for each group of said driving circuits and connected to said connecting line; and (d) a plurality of control circuits, each provided for each of said driving circuits and controlling an on and off operation of said first and second switch elements selectively in a first, a second and a third operational mode, said first and second switch elements being alternately turned on in said first operational mode to intermittently connect said transducer to said DC power supply so that an intermittent driving signal is applied to said transducer element with a period of said intermittent driving signal being determined by said alternating operation of said first and second switch elements, said first switch element being kept off and said second switch element being kept on in said second operational mode so that the output signal from said transducer element is supplied to said receiving circuit, and both of said first and second switch elements being kept off so that said transducer element is not selected in said third operational mode.

4. A transmitter/receiver of an ultrasonic device according to claim 3, wherein said driver circuits in each group include driver circuits connected to transducer elements which are separately arranged in a particular pitch in said array.

5. A transmitter/receiver of an ultrasonic device according to claim 3, wherein said driver circuits in each group include driver circuits connected to transducer elements which are arranged on a same row of a two-dimensional array of transducer elements.

* * * * *